No. 758,065. PATENTED APR. 26, 1904.
W. A. HALL.
PROCESS OF PRODUCING MILK SUGAR.
APPLICATION FILED FEB. 28, 1903.
NO MODEL.
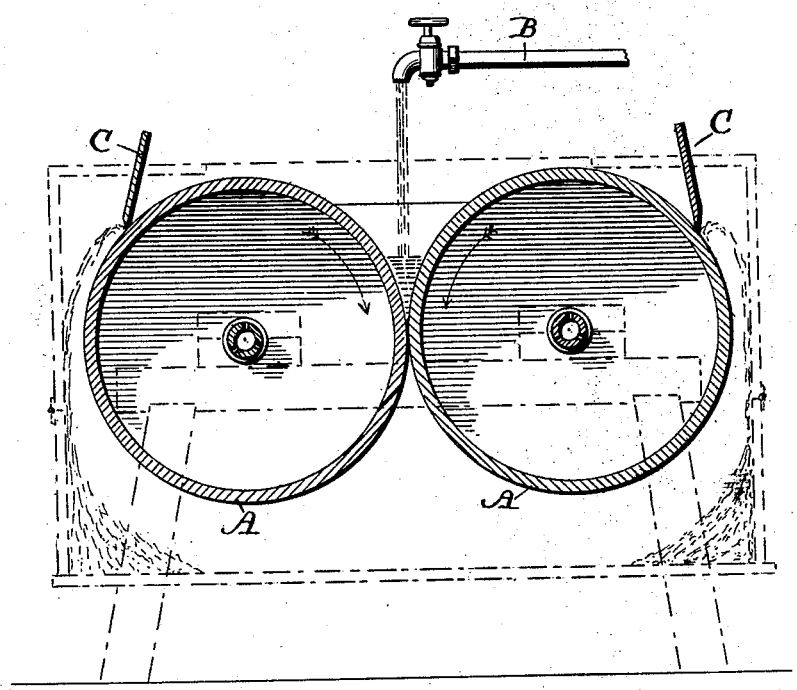
WITNESSES:
INVENTOR:
Wm A. Hall
BY
Attorney.

No. 758,065. Patented April 26, 1904.

UNITED STATES PATENT OFFICE.

WILLIAM A. HALL, OF BELLOWS FALLS, VERMONT.

PROCESS OF PRODUCING MILK-SUGAR.

SPECIFICATION forming part of Letters Patent No. 758,065, dated April 26, 1904.

Application filed February 28, 1903. Serial No. 145,571. (No specimens.)

*To all whom it may concern:*

Be it known that I, WILLIAM A. HALL, a citizen of the United States, residing at Bellows Falls, in the county of Windham and State of Vermont, have invented or discovered certain new and useful Improvements in Processes of Producing Milk-Sugar, of which the following is a specification.

It is well known that whey or serum contains sugar or milk (combined with a small percentage of salts) and that crude milk-sugar may be obtained from the whey or serum by proper treatment.

The present invention relates to the manufacture of this crude milk-sugar; and it consists of a new process of treating milk and whey to obtain sugar therefrom, and which process is simple, rapid in results, easily practiced, and by following which a maximum quantity and high grade of crude sugar may be produced from a given amount of stock.

In carrying the invention or discovery into effect the milk, previously deprived of its cream, is treated with a dilute solution of an acid—as, for example, sulfuric or muriatic acid—or instead of an acid rennet may be used to precipitate the casein therein, and which casein is then separated from the whey in any suitable manner. The whey or serum which is left is then preferably heated to a sufficiently high temperature (140° Fahrenheit or in excess thereof being found to give satisfactory results) for a length of time necessary to cause the precipitation of the albumen, or the greater part thereof, which remains in the whey. The albumen thus precipitated is then extracted by any suitable and effective filtration process. The whey thus freed of its other milk constituents is then subjected to the action of a heated surface, (preferably a steam-heated metal cylinder-machine, of which the well-known Merrill-Soule machine is a type, being used,) and the temperature of which heated surface is sufficiently high to cause instant boiling of the whey and instant coagulating of all of the albumen still remaining in the whey, a peripheral temperature considerably in excess of 212° Fahrenheit being preferable. In this evaporating process the crude sugar condensed from the whey sticks to the heated surface of the cylinder in a thin pellicle or film. The film thus formed on the heated surface is immediately scraped off before it has become absolutely dry and before any caramelization of the sugar in the whey can take place, or at least before the sugar caramelizes to a harmful degree, the product being a very good quality of crude milk-sugar.

The accompanying drawing illustrates an apparatus which may be employed in carrying my invention into effect.

In this illustrated apparatus two contiguously-placed rotating steam-heated cylinders A A receive in the "pinch" between them the whey coming from a supply-pipe B to be evaporated. These cylinders will preferably be about twenty-eight or thirty inches in diameter and about five feet long and will be rotated at a speed of about six or seven turns a minute and will preferably be heated by a steam-pressure of about forty-five pounds to the square inch, so that the sugar of the whey will be condensed to solidity and nearly to dryness as the cylinders rotate, and the films of sugar thus formed will be constantly removed by stationary scrapers C.

In the process at present employed in the manufacture of crude milk-sugar the whey is boiled sufficiently to coagulate a certain amount of the albumen. This coagulated albumen is then removed from the whey by the use of a filter-press or other suitable means. The whey is then evaporated in vacuum, and as it is condensed to a certain consistency more albumen is coagulated, thus necessitating the removal of the condensed whey from the vacuum-pan and subjecting the same to another filtration. Even this second filtration is sometimes not sufficient to remove the entire amount of albumen, and a third filtration is necessary. By my novel process I entirely overcome the necessity of refiltration after condensation, as upon drying the whey upon the very hot cylinders all of the albumen is coagulated and can be very easily separated upon dissolving the crude sugar in the refining process, one filtration after condensation being sufficient to remove every trace of the albumen.

While I have mentioned a machine of the

Merrill-Soule type as being suitable for carrying out my process, I wish it to be distinctly understood that I do not limit myself to any particular apparatus for doing the work, as the invention resides in the process described and claimed irrespective of the mechanical means employed to carry it into effect.

Having thus described my invention or discovery, I claim and desire to secure by Letters Patent—

1. The process of obtaining sugar from milk which consists in extracting the cream from the milk, precipitating the casein by means of a dilute acid, heating the whey, to precipitate the greater portion of the albumen therein, removing the precipitated albumen, then subjecting the whey in a thin film to the action of a heated metal surface to precipitate the remaining albumen, removing the condensed film from such heated surface before it is absolutely dry and before caramelization of the sugar has taken place, and finally separating the remaining albumen from the crude sugar.

2. The herein-described process of treating whey, in making milk-sugar, to coagulate the albumen, consisting in subjecting the whey to the action of heat at a temperature in excess of 212° Fahrenheit on a moving metal surface until the whey is condensed in a film on such surface, then removing the film of sugar condensed from the whey before it is fully dry, and then separating the coagulated albumen from the crude milk-sugar by dissolving the sugar and filtering the solution.

In testimony whereof I affix my signature in presence of two witnesses.

WILLIAM A. HALL.

Witnesses:
F. J. WALSH,
A. B. ROMEN.